US010488778B2

(12) United States Patent
Kuroda

(10) Patent No.: US 10,488,778 B2
(45) Date of Patent: Nov. 26, 2019

(54) CHARGING ROLLER WITH CURVED ROLLER SURFACE

(71) Applicant: HEWLETT-PACKARD DEVELOPMENT COMPANY, L.P., Spring, TX (US)

(72) Inventor: Noriaki Kuroda, Yokohama (JP)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/224,135

(22) Filed: Dec. 18, 2018

(65) Prior Publication Data

US 2019/0212669 A1 Jul. 11, 2019

(30) Foreign Application Priority Data

Oct. 30, 2017 (JP) ................................ 2017-209088
Jul. 18, 2018 (JP) ................................ 2018-135238

(51) Int. Cl.
*G03B 15/02* (2006.01)
*G03G 15/02* (2006.01)
*G03G 15/08* (2006.01)

(52) U.S. Cl.
CPC ..... *G03G 15/0233* (2013.01); *G03G 15/0818* (2013.01)

(58) Field of Classification Search
CPC ........... G03G 15/0233; G03G 15/0818; G03G 21/1814
See application file for complete search history.

(56) References Cited

U.S. PATENT DOCUMENTS 5,459,558 A * 10/1995 Ishiyama ........... G03G 15/0233 361/225
8,712,291 B2 * 4/2014 Suzuki ............... G03G 21/1814 399/176
2013/0287444 A1 10/2013 Suzuki et al.

FOREIGN PATENT DOCUMENTS

JP 10161390 A 6/1998
JP 2002116608 A 4/2002
JP 2007206148 A 8/2007
JP 1020150069131 A 5/2015

* cited by examiner

*Primary Examiner* — Hoang X Ngo
(74) *Attorney, Agent, or Firm* — Staas & Halsey LLP

(57) ABSTRACT

A charging roller includes a curved roller surface, and the shape of the roller surface is represented by $Y/Y_1=(X/X_1)\exp(\alpha)$. A distance between a middle point and an arbitrary point on a rotation axis is denoted by X, a reduction in a radius at the arbitrary point from the maximum radius at the middle point is denoted by Y, a distance between the middle point and the position of an end portion of a roller body on the rotation axis is denoted by $X_1$, and a reduction in the radius at the position of the end portion from the maximum radius at the middle point is denoted by $Y_1$.

15 Claims, 9 Drawing Sheets

CHARGING ROLLER WITH CURVED ROLLER SURFACE

CROSS REFERENCE TO RELATED APPLICATIONS

This application claims the priority benefit of Japan Patent Application No. 2017-209088 filed on Oct. 30, 2017, and of Japan Patent Application No. 2018-135238 filed on Jul. 18, 2018, each of which are incorporated by reference herein in their entirety.

BACKGROUND

An image forming apparatus includes a photoreceptor, a charging device, an exposure device that forms an electrostatic latent image on the photoreceptor, a developing device that applies toner to the electrostatic latent image to develop the electrostatic latent image, and a transfer device that transfers a toner image formed on the photoreceptor to a transfer material. The charging device is provided with a charging roller that charges the photoreceptor.

DETAILED DESCRIPTION

In the following description, with reference to the drawings, the same reference numbers are assigned to the same components or to similar components having the same function, and overlapping description is omitted.

Figure 1:
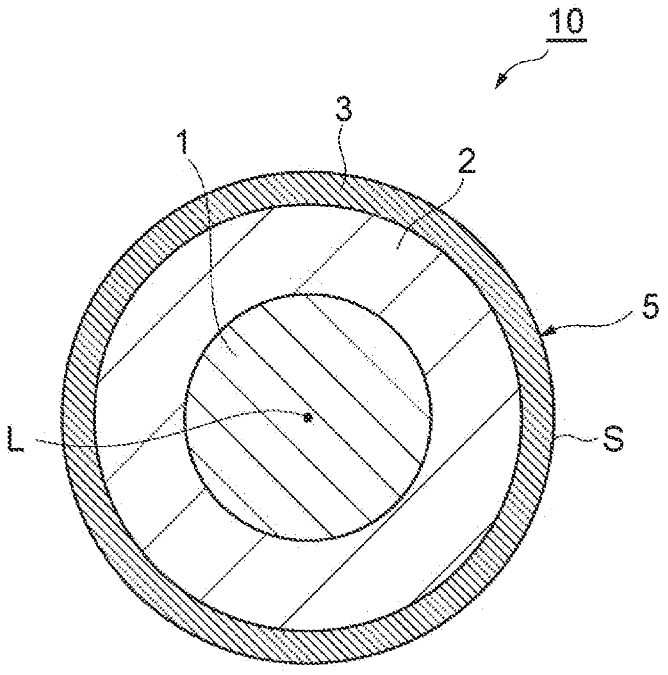
FIG. 1 is a schematic cross-sectional view illustrating an example charging roller.

An example charging roller 10 illustrated in FIG. 1 is provided in an image forming apparatus as charging means for charging a photoreceptor. The charging roller 10 performs processing for uniformly charging the surface of a photoreceptor that is an image carrier.

The charging roller 10 includes a roller body 5. The roller body 5 has the shape of a roller that is rotated about a rotation axis L. The roller body 5 is rotationally symmetric with respect to the rotation axis L. The charging roller 10 may include a conductive support 1 that serves as the rotating shaft of the roller body 5. The roller body 5 may be rotated about the rotation axis L of the conductive support 1. For example, the roller body 5 may include a conductive elastic body layer 2 that is laminated on the outer peripheral surface of the conductive support 1 and a conductive resin layer 3 that is laminated on the conductive elastic body layer 2 as the outermost layer. In some examples, an intermediate layer, such as a resistance adjustment layer for improving voltage resistance (leakage resistance), may be interposed between the conductive elastic body layer 2 and the conductive resin layer 3.

Conductive Support

The conductive support 1 may be made of metal. The conductive support 1 may be a hollow body pipe shape, circular-pipe shape, a solid body, rod shape, or the like that is made of, for example, iron, copper, aluminum, nickel, or stainless steel. A plating process may be performed on the outer peripheral surface of the conductive support 1 to provide rust resistance or scratch resistance without impairing conductivity. Further, an adhesive, a primer, and the like may be applied to the outer peripheral surface of the conductive support 1 to improve the adhesiveness of the conductive support 1 to the conductive elastic body layer 2. In some examples, the adhesive, the primer, and the like may be made conductive to ensure sufficient conductivity.

The conductive support 1 may have the shape of, for example, a column having a length of 250 to 360 mm. A portion of the conductive support 1, which is covered with the conductive elastic body layer 2, is formed in the shape of, for example, a column or a circular pipe extending in the direction of the rotation axis L of the conductive support 1 (a direction in which the conductive support 1 extends), and the diameter (outer diameter) thereof may be constant in the direction of the rotation axis L (the shape of a straight column or a straight circular pipe). Further, the diameter of the portion of the conductive support 1, which is covered with the conductive elastic body layer 2, may be in the range of, for example, 8 mm to 10 mm. Portions of the conductive support 1 which are not covered with the conductive elastic body layer 2, such as both end portions of the conductive support 1, may be supported by support members. The diameter of each of the portions of the conductive support 1, which are not covered with the conductive elastic body layer 2, may be smaller than, for example, the diameter of the portion of the conductive support 1 that is covered with the conductive elastic body layer 2. In a state in which the conductive support 1 is supported by the support members, the conductive support 1 is rotated about the rotation axis (the center line of the shape of the column) L of the conductive support 1.

The conductive support 1 is biased toward the photoreceptor so that the surface of the conductive resin layer 3 is in contact with the surface of the photoreceptor. For example, a load is applied to each of both end portions of the conductive support 1 toward the photoreceptor to push the surface of the conductive resin layer 3 against the surface of the photoreceptor. In terms of ensuring contact between the charging roller 10 and the photoreceptor that is rotating, a load in the range of, for example, 450 grams to 750 grams may be applied to one end portion of the conductive support 1.

Conductive Elastic Body Layer

The conductive elastic body layer 2 may be elastic to ensure uniform adhesion to the photoreceptor. For example, a base polymer that forms the conductive elastic body layer 2 may comprise a natural rubber, a synthetic rubber, a synthetic resin, or any combination thereof. The synthetic rubber may include one or more of ethylene-propylene-diene monomer rubber (EPDM), styrene-butadiene rubber (SBR), silicone rubber, a polyurethane elastomer, epichlorohydrin rubber, isoprene rubber (IR), butadiene rubber (BR), acrylonitrile-butadiene rubber (NBR), hydrogenated NBR (H-NBR), and chloroprene rubber (CR). The synthetic resins may include one or more of a polyamide resin, a polyurethane resin, and a silicone resin. One of the elastic materials may be used alone or two or more of them may be used together.

One or more additives, such as a conductive agent, a vulcanizing agent, a vulcanization accelerator, a lubricant, and an auxiliary agent, may be selectively mixed with the base polymer to provide one or more particular characteristics to the conductive elastic body layer 2. However, in terms of forming stable resistance, the conductive elastic body layer 2 may contain epichlorohydrin rubber as a main component. In some examples, the conductive elastic body layer 2 may contain epichlorohydrin rubber by approximately 50 mass % or more or may contain epichlorohydrin rubber by approximately 80 mass % or more.

Additionally, carbon black, graphite, potassium titanate, iron oxide, conductive titanium oxide (c-$TiO_2$), conductive zinc oxide (c-ZnO), conductive tin oxide (c-$SnO_2$), quaternary ammonium salt, and the like, or any combination thereof, may be used as the conductive agent. Sulfur and the like may be used as the vulcanizing agent. Tetramethylthiuram disulfide (CZ) and the like may be used as the vulcanization accelerator. Stearic acid and the like may be used as the lubricant. Zinc oxide (ZnO) and the like may be used as the auxiliary agent.

To selectively obtain a particular characteristic of elasticity, the thickness of the conductive elastic body layer 2 may be in the range of, for example, approximately 1.25 mm to 3.00 mm.

Conductive Resin Layer

Figure 2:
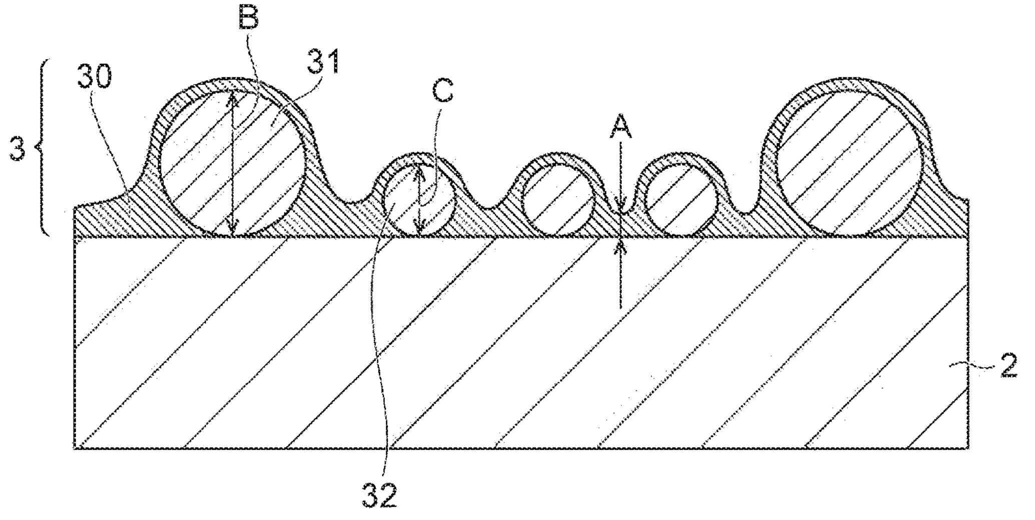
FIG. 2 is an enlarged schematic cross-sectional view illustrating the surface of an example conductive resin layer.

As illustrated in FIG. 2, the conductive resin layer 3 includes a material (matrix material) 30 that forms a matrix and particles that are dispersed in the material. The particles include first particles 31 and second particles 32. In some examples, the type of the first particle 31 and the type of the second particle 32 are different from each other. A first resin particle or a first inorganic particle is used as the first particle 31. A second resin particle or a second inorganic particle is used as the second particle 32. In some examples, the conductive resin layer 3 includes the matrix material and two types of particles of which the types are different from each other. For a case in which the types of particles are different from each other, the shapes of the particles and the like may be different from each other. For example, if the shape of the first particle 31 and the shape of the second particle 32 are different from each other even though the material of the first particle 31 is the same as the material of the second particle 32, the type of the first particle 31 may be considered different from the type of the second particle 32.

The matrix material 30 may be selected so that it does not contaminate the photoreceptor that is a body to be charged. For example, a base polymer, such as a fluororesin, a polyamide resin, an acrylic resin, a nylon resin, a polyurethane resin, a silicone resin, a butyral resin, a styrene-ethylene-butylene-olefin copolymer (SEBC), or an olefin-ethylene-butylene-olefin copolymer (CEBC), may be used as the matrix material 30. One of them may be used alone or two or more of them may be used together. In terms of the ease of handling, the degree of freedom in material design, and the like, the matrix material may be at least one material selected from the group of materials consisting of a fluororesin, an acrylic resin, a nylon resin, a polyurethane resin, and a silicone resin, or may be at least one material selected from the group of materials consisting of a nylon resin and a polyurethane resin.

In some examples, the thickness A of a layer of a portion of the conductive resin layer 3 not including the first and second particles 31 and 32, may satisfy 1.0 μm≤A≤7.0 μm (a portion "A" in FIG. 2). For example, the thickness A of the layer of the matrix material 30 is a thickness at a midpoint between particles closest to each other. When the thickness A is 1.0 μm or more, it is easy for the matrix material 30 to continuously retain the resin particles to be added over a long period of time without the separation of the resin particles. When the thickness A is 7.0 μm or less, charging performance is easily maintained. From this point of view, the thickness (thickness A) of the conductive resin layer may be selected so as to satisfy the relationship 1.0 μm≤A≤7.0 μm. The cross-section of the roller is obtained using a sharp cutting tool and is observed with an optical microscope or an electron microscope for the measurement of the thickness of the conductive resin layer 3.

In some examples, the first and second particles 31 and 32 are resin particles or inorganic particles and can form irregularities on the surface of the conductive resin layer to sufficiently ensure discharge points. For example, a urethane resin, a polyamide resin, a fluororesin, a nylon resin, an acrylic resin, a urea resin, and the like may be used as the material of the resin particle. One of them may be used alone or two or more of them may be used together. In a case in which the first resin particle is used as the first particle 31, the first resin particle may be any one of a nylon particle, a urethane particle, and an acrylic particle in terms of compatibility with the matrix material 30, dispersion retainability after the addition of the particles, stability (pot life) after the change of the particles into paint, and the like. Likewise, in a case in which the second resin particle is used as the second particle 32, the second resin particle may be any one of a nylon particle, a urethane particle, and an acrylic particle.

Further, the first and second particles 31 and 32 may be insulating particles.

In some examples, the first and second particles 31 and 32 can form irregularities on the surface of the conductive resin layer. The shapes of the first and second particles 31 and 32 may be, for example, a perfectly spherical shape, an ellipsoidal shape, an amorphous shape, or the like. In some examples, amorphous particles may be used in terms of suppressing the separation of the first and second particles 31 and 32.

In terms of suppressing charging unevenness that is an initial image defect, the average particle size B of the first particles 31 may satisfy 15.0 μm≤B≤40.0 μm (a portion "B" in FIG. 2). Further, in terms of suppressing charging unevenness, a partical variation value, which is obtained by subtracting the average particle size C of the second particles 32 (a portion "C" in FIG. 2) from the average particle size B of the first particles 31, may be 10 μm or more (10.0 μm≤B−C).

By way of example, 100 particles may be arbitrarily selected from a population of a plurality of particles by SEM observation and the average of the particle sizes of the 100 particles is obtained, so that the average particle size of each of the first and second particles 31 and 32 can be deduced. However, in a case in which the shape of the particle is not a perfectly spherical shape and the particle size is not uniformly determined as in the case of an ellipsoidal shape (a sphere of which the cross-section has an elliptical shape), an amorphous shape, or the like, the simple average of the largest diameter and the smallest diameter of a particle can be used as the particle size of the particle.

An interparticle distance Sm between particles included in the conductive resin layer 3 (for example, an interparticle distance between all particles including the first and second particles 31 and 32) may satisfy 50 μm≤Sm≤250 μm. When the interparticle distance Sm is 50 μm or more, the roughness of the surface of the conductive resin layer 3 and the separation of the particles are easily suppressed. On the other hand, when the interparticle distance Sm is 250 μm or less, the separation of the particles is also easily suppressed. An interparticle distance can be measured in accordance with JIS B0601-2001.

The parts by mass of the first and second particles 31 and 32 based on the parts by mass of the conductive resin layer 3 may be in the range of 10% to 70%. The content of the particles included in the conductive resin layer 3 can be quantified as follows. For example, the content of particles can be quantified (TG-DTA-MS, DSC (thermal analysis)) through the measurement of a change in weight (TG), differential heat (DTA), the amount of heat (DSC), and the mass (MS) of a volatile component that are generated in a case in which the conductive resin layer 3 is sampled from the charging roller and is heated.

Additionally, various conductive agents (such as conductive carbon, graphite, copper, aluminum, nickel, iron powder, conductive tin oxide, conductive titanium oxide, ion conductive agent, and the like), a charging control agent, and the like may be included in the base polymer in addition to the above-mentioned particles.

The ten-point average roughness Rzjis of the surface of the charging roller 10 may satisfy 15.0 μm≤Rzjis≤40.0 μm. Since the ten-point average roughness is 15.0 μm or more, charging performance can be sufficiently ensured. Additionally, since the ten-point average roughness is 40.0 μm or less, the stability of paint can be obtained.

The ten-point average roughness of the surface of the charging roller 10 can be measured in accordance with JIS B0601-2001 by a surface roughness measuring instrument SE-3400 that is manufactured by Kosaka Laboratory Ltd. Further, the surface properties of the charging roller 10, which include these characteristics, can be adjusted by a change in the size of particles to be added to the conductive resin layer 3, a change in the amount of the particles, or the like.

Figure 3:
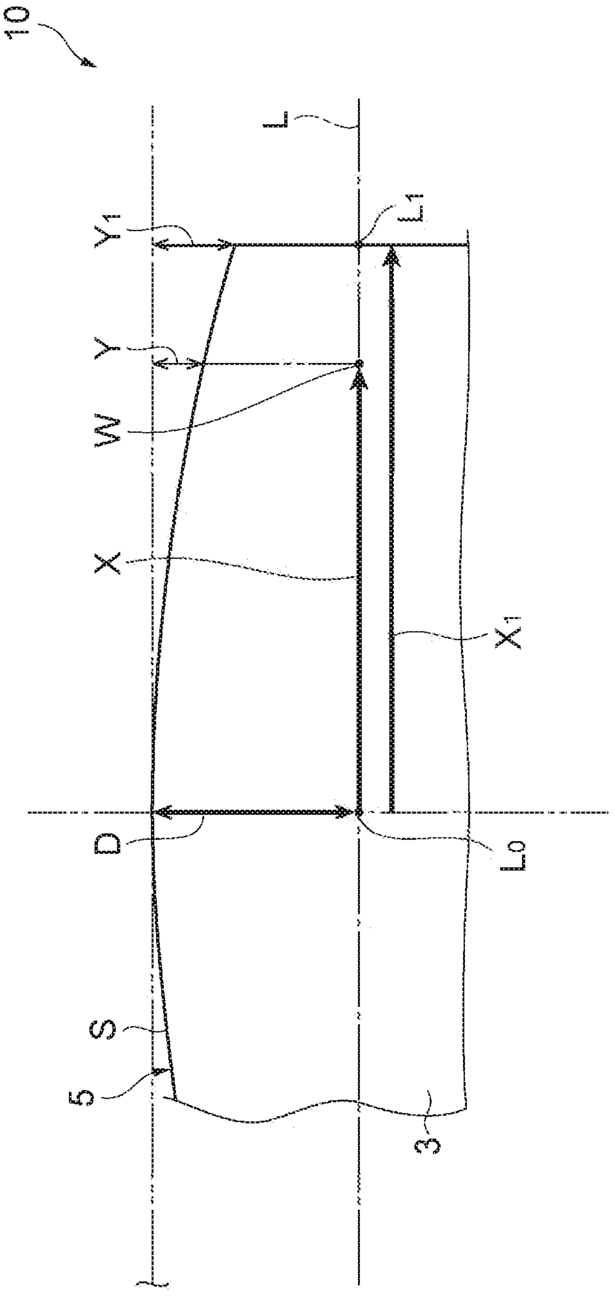
FIG. 3 is a diagram illustrating an example shape of the roller surface of a roller body.

The roller body 5 may include the shape of a roller that is rotated about the rotation axis L of the conductive support 1 as illustrated in FIG. 3. Further details of the roller shape of the roller body 5 are described below. The roller body 5 includes a curved roller surface S. In some examples, the roller surface S is the surface of the conductive resin layer 3. A radius from the rotation axis L to the roller surface S becomes maximum at a middle point $L_0$ of the roller body 5 on the rotation axis L, and is reduced toward both end portions of the roller body 5. In some examples, the middle point $L_0$ of the roller body 5 is the middle position of the roller body 5 on the rotation axis L in the direction of the rotation axis L.

The amount of crown may be described as the roller shape of the roller body 5. The amount of crown of the roller body 5 may be in the range of 50 μm to 110 μm in terms of achieving charging uniformity and stability over a long period of time and maintaining graininess in image quality while the roller body 5 is in close contact with the photoreceptor.

Further, the shape of the roller surface S may be expressed by the following Expression (1).

$$Y/Y_1=(X/X_1)\exp(\alpha) \quad (1)$$

As illustrated in FIG. 3, a distance between the middle point $L_0$ and an arbitrary point W on the rotation axis L is denoted by X. A reduction in a radius at the arbitrary point W from the maximum radius D at the middle point $L_0$ is denoted by Y. A distance between the middle point $L_0$ and the position $L_1$ of an end portion of the roller body 5 on the rotation axis L is denoted by $X_1$. A reduction in a radius at the position $L_1$ of the end portion from the maximum radius D at the middle point $L_0$ is denoted by $Y_1$.

A constant α may satisfy 1.5≤α≤2.5 in terms of achieving charging uniformity and stability over a long period of time and maintaining graininess in image quality while the roller body 5 is (or remains) in close contact with the photoreceptor. From the same point of view, the constant α may satisfy 1.8≤α≤2.2.

Figure 4:
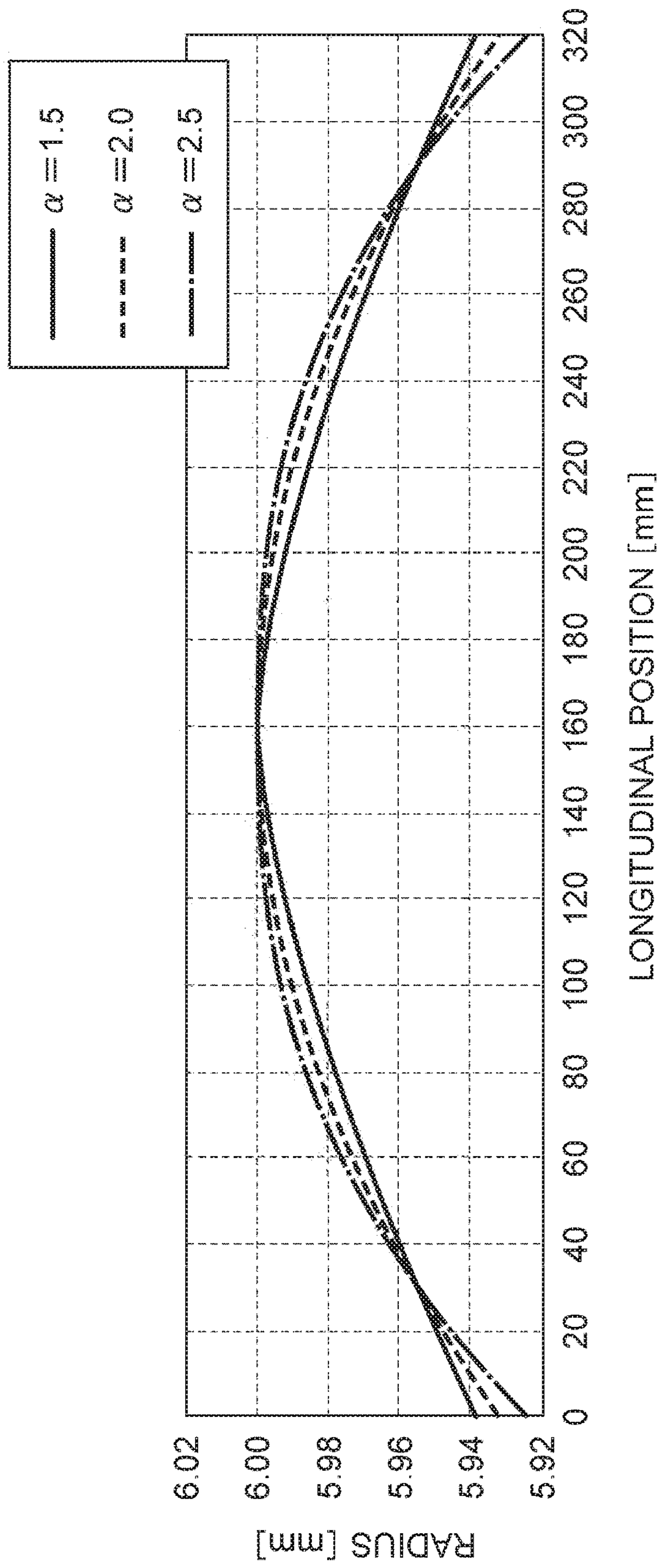
FIG. 4 is a diagram illustrating additional example shapes of a roller surface.

FIG. 4 illustrates the roller shape of the roller body 5 in a first case in which the constant α is 1.5, the roller shape of the roller body 5 in a second case in which the constant α is 2.0, and the roller shape of the roller body 5 in a third case in which the constant α is 2.5. The width of the roller body 5 (the length of the roller body 5 in the direction of the rotation axis L) is set to 320 mm. FIG. 4 illustrates the radii of the roller body 5 at the respective positions in the longitudinal direction of the roller body 5 (width direction). Since the values of the constant α are different from each other as illustrated in FIG. 4, the roller shapes of the roller body 5 are also different from each other.

Further, Asker C hardness of the roller body 5 is in the range of 74 to 82.

In some examples, a DC voltage may be exclusively applied to the charging roller 10. Since the charging roller 10 has the above-mentioned structure, charging uniformity and stability over a long period of time can be achieved and graininess in image quality can be maintained even in a case in which the DC voltage is exclusively applied (e.g., no AC voltage is applied). In some examples, a bias voltage to be applied during the output of an image may be in the range of −1000 to −1500 V. Accordingly, it is easy to maintain charging performance under various environments and to control image density and various conditions. In examples in which the bias voltage is lower than −1000 V, it may be difficult to optimize development conditions that are required for forming an image. On the other hand, since excessive discharge at portions of the conductive resin layer corresponding to the particles is likely to occur in a case in which the bias voltage is higher than −1500 V, white spot-like image defects are likely to be caused after the formation of an image.

Method of Manufacturing Charging Roller

The charging roller 10 illustrated in FIG. 1 can be manufactured as follows. For example, materials for the conductive elastic body layer 2 are kneaded using a kneading machine, such as a kneader, to prepare a material for the conductive elastic body layer. Further, materials for the conductive resin layer 3 are kneaded using a kneading machine, such as a roll, and an organic solvent is added to this mixture and is mixed and stirred to prepare application liquid for the conductive resin layer. Then, a mold for injection molding in which a core rod, which forms the conductive support 1, is set is filled with the material for the conductive elastic body layer and heating crosslinking is performed under predetermined conditions. After that, the mold is removed, so that a base roll where the conductive elastic body layer 2 is formed along the outer peripheral surface of the conductive support 1 is manufactured. Then, the outer peripheral surface of the base roll is coated with the application liquid for the conductive resin layer, so that the conductive resin layer 3 is formed. The charging roller 10 where the conductive elastic body layer 2 is formed on the outer peripheral surface of the conductive support 1 and the conductive resin layer 3 is formed on the outer peripheral surface of the conductive elastic body layer 2 can be manufactured in this way.

In addition to or instead of using injection molding, a method of forming the conductive elastic body layer 2 may include a cast molding method or a method using a combination of press forming and polishing. Further, a method of coating an object with the application liquid for the conductive resin layer may include a dipping method, a spray-coating method, a roll coating method, and the like, or any combination thereof.

Example charging rollers 10 will be described in more detail using Reference Examples by way of non-exhaustive illustration.

Preparation of Material for Forming Conductive Elastic Body Layer

With reference to Table 1 and Table 2, a Reference Example 1 may be manufactured as follows. 100.00 parts by mass of epichlorohydrin rubber ("EPICHLOMER CG-102" manufactured by DAISO CO., LTD.) as a rubber component, 5.00 parts by mass of sorbitan fatty acid ester ("SPLENDER R-300" manufactured by Kao Corporation) as a lubricant, 5.00 parts by mass of ricinoleic acid as a softener, 0.50 part by mass of a hydrotalcite compound ("DHT-4A" manufactured by Kyowa Chemical Industry Co., Ltd.) as an acid receptor, 1.00 part by mass of tetrabutylammonium chloride (ion conductive agent) ("tetrabutylammonium chloride" manufactured by Tokyo Chemical Industry Co., Ltd.) as a conductive agent, 50.00 parts by mass of silica ("Nipsil ER" manufactured by Tosoh Silica Corporation) as a filler, 5.00 parts by mass of zinc oxide, 1.50 parts by mass of benzothiazole sulfide, and 0.50 part by mass of tetramethylthiuram monosulfide as a crosslinking promoter, and 1.05 parts by mass of sulfur as a crosslinking agent were mixed and were kneaded using a predetermined roll, so that a material for forming the conductive elastic body layer was prepared.

Preparation of Application Liquid for Forming Conductive Resin Layer)

100.00 parts by mass of thermoplastic N-methoxy methylated-6 nylon ("TORESIN F-30K" manufactured by Nagase ChemteX Corporation) as a polymer component, 5.00 parts by mass of methylenebis ethyl methyl aniline ("CUREHARD-MED" manufactured by Ihara Chemical Industry Co., Ltd.) as a curing agent, and 18.00 parts by mass of carbon black (electronically conductive agent) ("DENKA BLACK HS100" manufactured by Denki Kagaku Kogyo K.K.) as a conductive agent were mixed with tetrahydrofuran (THF). Two types of amorphous nylon-resin particles ("Orgasol series" manufactured by Arkema Inc.) having different average particle sizes were added to this liquid mixture as the first and second particles 31 and 32 by the amounts shown in Table 1, and were sufficiently stirred until a solution became uniform. After that, the respective components were made to be dispersed in the solution by two rolls. Accordingly, application liquid for forming the conductive resin layer was prepared.

The average particle size of the resin particles was measured as follows. 100 particles were arbitrarily selected from a population of a plurality of particles by SEM observation, and the average of the particle sizes of the 100 particles was defined as the average particle size of the resin particles. Since the shape of the used resin particle is an amorphous shape, the simple average of the largest diameter and the smallest diameter of the observed particle was defined as the particle size of each particle.

Manufacture of Charging Roller

A roll molding mold including a columnar roll molding space was prepared and a core rod (conductive support 1) having a diameter of 8 mm was set coaxially with the roll molding space. The material for forming the conductive elastic body layer prepared as described above was injected into the roll molding space in which the core rod was set, and the roll molding mold was cooled and removed after being heated at 170° C. for 30 minutes. Accordingly, a conductive elastic body layer 2, which was formed along the outer peripheral surface of the conductive support 1 serving as a conductive shaft body and having a thickness of 2 mm (a thickness at a middle position in the direction of the rotation axis L), was obtained. After that, end portions of the conductive elastic body layer 2 were cut to adjust the length of the conductive elastic body layer 2 to 320 mm.

Then, the surface of the conductive elastic body layer 2 of a roll body was coated with the application liquid for forming the conductive resin layer, which was prepared as described above, by a roll coating method. In this case, coating was performed while excess application liquid was scraped off by a scraper so that the application liquid had a particular thickness. After a coating film was formed, this coating film was heated at 150° C. for 30 minutes to form the conductive resin layer 3 having a thickness A of 4.0 μm. Accordingly, the charging roller 10, which includes the shaft body (conductive support 1), the conductive elastic body layer 2 formed along the outer peripheral surface of the shaft body, and the conductive resin layer 3 formed along the outer peripheral surface of the conductive elastic body layer 2, was manufactured.

The constant $\alpha$, which specifies the roller shape of the roller body 5, was set to 2.0. The amount of crown was set to 50 μm.

Additional Reference Examples and Comparative Example charging rollers were manufactured in the same manner as Reference Example 1 except that one or more of the constant $\alpha$, the amount of crown, the diameter of the core rod (conductive support 1), the thickness A of the conductive resin layer 3, the types of added particles, the amount of added particles, and the like were changed and adjusted as shown in Tables 1 and 2. As in Reference Example 1, amorphous nylon-resin particles ("Orgasol series" manufactured by Arkema Inc.) were used as both the first and second particles 31 and 32. However, in Comparative Example 1, the second particles 32 are not used and instead the amorphous nylon-resin particles were added as the first particles 31. Further, in Comparative Example 3, PMMA having average particle sizes different from each other and in a spherical shape was used as the first and second particles 31 and 32.

The obtained charging rollers were evaluated as follows, with the results of the evaluation shown in Tables 1 and 2. In Table 1, the content [phr] of particles means the amount of added particles (parts by mass) based on 100 parts by mass of a matrix material (N-methoxy methylated-6 nylon).

a) Thickness of Conductive Resin Layer 3

Several portions were measured with a magnification of 5000 by a scanning electron microscope (SEM), so that the thickness A of the conductive resin layer 3 was measured.

b) Surface Properties of Conductive Resin Layer 3

The interparticle distance Sm and the ten-point average roughness (Rzjis) of the roller surface S (the surface of the conductive resin layer 3) were measured with a method according to JIS B0601-2001 by a surface roughness measuring instrument SE-3400, which is manufactured by Kosaka Laboratory Ltd. in a state in which a cut-off value was set to 0.8 mm, a measurement speed was set to 0.5 mm/s, and a measurement length was set to 8 mm. Six arbitrary portions on the surface of the conductive resin layer 3 were measured by this measuring instrument, and averages obtained at the six portions were defined as the respective measured values.

c) Hardness of Charging Roller 10

Asker C hardnesses of the charging rollers 10 are shown in Table 2.

d) Evaluation of Image Formation

MultiXpress MX7 Series X7600GX manufactured by SAMSUNG was used as the image forming apparatus. Each charging roller obtained as described above was built in Multixpress MX7 Series X7600GX, and image formation was evaluated under the following conditions.

Printing environment: under normal temperature and normal humidity environment (23° C./60% RH)

Printing condition: a normal print speed of 280 mm/sec, the half speed of the normal print speed, the number of printed sheets (two points of 180 kPV and 360 kPV), and the type of a sheet (OfficePaperEC)

Applied bias: an applied bias was expediently adjusted and determined so that the surface potential of the photoreceptor was −600 V.

Further, a load to be applied to one end portion of the conductive support 1 was set to loads shown in Table 2.

e-1) Evaluation of Micro Jitter

A halftone image was output by the image forming apparatus. Micro jitters appearing in the image were visually observed and were evaluated on the basis of the following criteria. The results of the evaluation are shown in Table 2. A micro jitter is one of indicators that are used to evaluate charging uniformity. Micro jitters were observed at the initial stage of formation of an image (initial stage) and after an endurance test (after run) to determine whether or not charging uniformity and stability over a long period of time is obtained.

Evaluation A: a uniform halftone image was obtained.

Evaluation B: charging unevenness slightly occurred at an end portion of an image.

Evaluation C: charging unevenness obviously occurred at an end portion of an image.

Evaluation D: charging unevenness occurred over the entire image.

e-2) Passive Rotation Stability

In a case in which printing was performed using the image forming apparatus, the stability of the rotation of the charging roller 10 to be rotated by the rotation of the photoreceptor was evaluated on the basis of the following criteria. The results of the evaluation are shown in Table 2.

The rotation of the charging roller 10 was measured by a handheld digital tachometer (HT-5500 manufactured by Ono Sokki Co., Ltd.). Evaluation was performed using a difference between the number of rotations (the number of rotations per unit time), which is theoretically calculated, and an actual measured value.

Evaluation A: a level where the difference is less than −1.0% and there is no quality issue.

Evaluation B: a level where the difference is less than −2.0% but an influence on an image causes few quality issues.

Evaluation C: a level where the difference is less than −3.0% and rotation unevenness partially occurs but an influence on an image is low.

Evaluation D: a level where the difference is −3.0% or more, unevenness occurs in the number of rotations, and an image is affected.

TABLE 1

| | | First particle | | | | | |
|---|---|---|---|---|---|---|---|
| | Thickness A [μm] | Particle size B [μm] | Material | Shape | Content [phr] | B/A |
| Reference Example 1 | 4.0 | 20 | Nylon | Amorphous shape | 35 | 5.0 |
| Reference Example 2 | 4.0 | 20 | Nylon | Amorphous shape | 35 | 5.0 |
| Reference Example 3 | 4.0 | 20 | Nylon | Amorphous shape | 35 | 5.0 |
| Reference Example 4 | 4.0 | 20 | Nylon | Amorphous shape | 35 | 5.0 |
| Reference Example 5 | 4.0 | 20 | Nylon | Amorphous shape | 35 | 5.0 |
| Reference Example 6 | 4.0 | 20 | Nylon | Amorphous shape | 35 | 5.0 |
| Reference Example 7 | 4.0 | 20 | Nylon | Amorphous shape | 35 | 5.0 |
| Reference Example 8 | 4.0 | 20 | Nylon | Amorphous shape | 35 | 5.0 |
| Reference Example 9 | 4.0 | 20 | Nylon | Amorphous shape | 35 | 5.0 |
| Reference Example 10 | 4.0 | 20 | Nylon | Amorphous shape | 35 | 5.0 |
| Reference Example 11 | 4.0 | 20 | Nylon | Amorphous shape | 35 | 5.0 |
| Reference Example 12 | 4.0 | 20 | Nylon | Amorphous shape | 35 | 5.0 |
| Reference Example 13 | 3.0 | 30 | Nylon | Amorphous shape | 25 | 10.0 |
| Reference Example 14 | 2.0 | 40 | Nylon | Amorphous shape | 15 | 20.0 |
| Reference Example 15 | 1.0 | 30 | Nylon | Amorphous shape | 25 | 30.0 |
| Reference Example 16 | 1.0 | 30 | Nylon | Amorphous shape | 25 | 30.0 |
| Reference Example 17 | 1.0 | 30 | Nylon | Amorphous shape | 25 | 30.0 |
| Reference Example 18 | 1.0 | 30 | Nylon | Amorphous shape | 25 | 30.0 |
| Reference Example 19 | 1.0 | 30 | Nylon | Amorphous shape | 25 | 30.0 |
| Reference Example 20 | 1.0 | 30 | Nylon | Amorphous shape | 25 | 30.0 |
| Reference Example 21 | 1.0 | 30 | Nylon | Amorphous shape | 25 | 30.0 |
| Reference Example 22 | 1.0 | 30 | Nylon | Amorphous shape | 25 | 30.0 |
| Reference Example 23 | 1.0 | 30 | Nylon | Amorphous shape | 25 | 30.0 |
| Reference Example 24 | 1.0 | 30 | Nylon | Amorphous shape | 25 | 30.0 |
| Reference Example 25 | 1.0 | 30 | Nylon | Amorphous shape | 25 | 30.0 |
| Reference Example 26 | 1.0 | 30 | Nylon | Amorphous shape | 25 | 30.0 |
| Reference Example 27 | 5.0 | 30 | Nylon | Amorphous shape | 25 | 6.0 |
| Reference Example 28 | 1.5 | 30 | Nylon | Amorphous shape | 25 | 20.0 |
| Reference Example 29 | 4.0 | 30 | Nylon | Amorphous shape | 25 | 7.5 |
| Reference Example 30 | 3.0 | 35 | Nylon | Amorphous shape | 20 | 11.7 |
| Reference Example 31 | 4.0 | 20 | Nylon | Amorphous shape | 35 | 5.0 |
| Reference Example 32 | 5.0 | 30 | Nylon | Amorphous shape | 25 | 6.0 |

TABLE 1-continued

| | | | | | | |
|---|---|---|---|---|---|---|
| Reference Example 33 | 4.0 | 30 | Nylon | Amorphous shape | 10 | 7.5 |
| Reference Example 34 | 2.0 | 30 | Nylon | Amorphous shape | 25 | 15.0 |
| Reference Example 35 | 2.0 | 40 | Nylon | Amorphous shape | 20 | 20.0 |
| Reference Example 36 | 1.0 | 30 | Nylon | Amorphous shape | 20 | 30.0 |
| Reference Example 37 | 5.0 | 30 | Nylon | Amorphous shape | 20 | 6.0 |
| Reference Example 38 | 2.0 | 40 | Nylon | Amorphous shape | 10 | 20.0 |
| Reference Example 39 | 7.0 | 35 | Nylon | Amorphous shape | 20 | 5.0 |
| Reference Example 40 | 7.0 | 35 | Nylon | Amorphous shape | 20 | 5.0 |
| Reference Example 41 | 7.0 | 35 | Nylon | Amorphous shape | 20 | 5.0 |
| Reference Example 42 | 7.0 | 35 | Nylon | Amorphous shape | 20 | 5.0 |
| Reference Example 43 | 7.0 | 35 | Nylon | Amorphous shape | 20 | 5.0 |
| Reference Example 44 | 7.0 | 35 | Nylon | Amorphous shape | 20 | 5.0 |
| Reference Example 45 | 7.0 | 35 | Nylon | Amorphous shape | 20 | 5.0 |
| Reference Example 46 | 7.0 | 35 | Nylon | Amorphous shape | 20 | 5.0 |
| Reference Example 47 | 7.0 | 35 | Nylon | Amorphous shape | 20 | 5.0 |
| Reference Example 48 | 7.0 | 35 | Nylon | Amorphous shape | 20 | 5.0 |
| Reference Example 49 | 7.0 | 35 | Nylon | Amorphous shape | 20 | 5.0 |
| Reference Example 50 | 7.0 | 35 | Nylon | Amorphous shape | 20 | 5.0 |
| Reference Example 51 | 3.0 | 30 | Nylon | Amorphous shape | 15 | 10.0 |
| Reference Example 52 | 1.0 | 20 | Nylon | Amorphous shape | 10 | 20.0 |
| Reference Example 53 | 1.0 | 20 | Nylon | Amorphous shape | 10 | 20.0 |
| Reference Example 54 | 1.0 | 20 | Nylon | Amorphous shape | 10 | 20.0 |
| Reference Example 55 | 1.0 | 20 | Nylon | Amorphous shape | 10 | 20.0 |
| Reference Example 56 | 1.0 | 20 | Nylon | Amorphous shape | 10 | 20.0 |
| Reference Example 57 | 1.0 | 20 | Nylon | Amorphous shape | 10 | 20.0 |
| Reference Example 58 | 1.0 | 20 | Nylon | Amorphous shape | 10 | 20.0 |
| Reference Example 59 | 1.0 | 20 | Nylon | Amorphous shape | 10 | 20.0 |
| Reference Example 60 | 1.0 | 20 | Nylon | Amorphous shape | 10 | 20.0 |
| Reference Example 61 | 1.0 | 20 | Nylon | Amorphous shape | 10 | 20.0 |
| Reference Example 62 | 1.3 | 40 | Nylon | Amorphous shape | 5 | 30.0 |
| Comparative Example 1 | 10.0 | 10 | Nylon | Amorphous shape | 5 | 1.0 |
| Comparative Example 2 | 1.0 | 40 | Nylon | Amorphous shape | 25 | 40.0 |
| Comparative Example 3 | 5.0 | 30 | PMMA | Spherical shape | 20 | 6.0 |

| | Second particle | | | | Total | |
|---|---|---|---|---|---|---|
| | Particle size C [μm] | Material | Shape | Content [phr] | amount of B + C [phr] | B − C [μm] |
| Reference Example 1 | 5.0 | Nylon | Amorphous shape | 35 | 70 | 15 |
| Reference Example 2 | 5.0 | Nylon | Amorphous shape | 35 | 70 | 15 |
| Reference Example 3 | 5.0 | Nylon | Amorphous shape | 35 | 70 | 15 |
| Reference Example 4 | 5.0 | Nylon | Amorphous shape | 35 | 70 | 15 |
| Reference Example 5 | 5.0 | Nylon | Amorphous shape | 35 | 70 | 15 |
| Reference Example 6 | 5.0 | Nylon | Amorphous shape | 35 | 70 | 15 |
| Reference Example 7 | 5.0 | Nylon | Amorphous shape | 35 | 70 | 15 |
| Reference Example 8 | 5.0 | Nylon | Amorphous shape | 35 | 70 | 15 |
| Reference Example 9 | 5.0 | Nylon | Amorphous shape | 35 | 70 | 15 |
| Reference Example 10 | 5.0 | Nylon | Amorphous shape | 35 | 70 | 15 |
| Reference Example 11 | 5.0 | Nylon | Amorphous shape | 35 | 70 | 15 |
| Reference Example 12 | 5.0 | Nylon | Amorphous shape | 35 | 70 | 15 |
| Reference Example 13 | 5.0 | Nylon | Amorphous shape | 45 | 70 | 25 |
| Reference Example 14 | 5.0 | Nylon | Amorphous shape | 55 | 70 | 35 |
| Reference Example 15 | 5.0 | Nylon | Amorphous shape | 45 | 70 | 25 |
| Reference Example 16 | 5.0 | Nylon | Amorphous shape | 45 | 70 | 25 |
| Reference Example 17 | 5.0 | Nylon | Amorphous shape | 45 | 70 | 25 |
| Reference Example 18 | 5.0 | Nylon | Amorphous shape | 45 | 70 | 25 |
| Reference Example 19 | 5.0 | Nylon | Amorphous shape | 45 | 70 | 25 |
| Reference Example 20 | 5.0 | Nylon | Amorphous shape | 45 | 70 | 25 |
| Reference Example 21 | 5.0 | Nylon | Amorphous shape | 45 | 70 | 25 |
| Reference Example 22 | 5.0 | Nylon | Amorphous shape | 45 | 70 | 25 |
| Reference Example 23 | 5.0 | Nylon | Amorphous shape | 45 | 70 | 25 |
| Reference Example 24 | 5.0 | Nylon | Amorphous shape | 45 | 70 | 25 |
| Reference Example 25 | 5.0 | Nylon | Amorphous shape | 45 | 70 | 25 |
| Reference Example 26 | 5.0 | Nylon | Amorphous shape | 45 | 70 | 25 |
| Reference Example 27 | 5.0 | Nylon | Amorphous shape | 35 | 60 | 25 |
| Reference Example 28 | 5.0 | Nylon | Amorphous shape | 35 | 60 | 25 |
| Reference Example 29 | 5.0 | Nylon | Amorphous shape | 30 | 55 | 25 |
| Reference Example 30 | 5.0 | Nylon | Amorphous shape | 35 | 55 | 30 |
| Reference Example 31 | 10.0 | Nylon | Amorphous shape | 25 | 60 | 10 |
| Reference Example 32 | 10.0 | Nylon | Amorphous shape | 25 | 50 | 20 |
| Reference Example 33 | 10.0 | Nylon | Amorphous shape | 25 | 35 | 20 |
| Reference Example 34 | 10.0 | Nylon | Amorphous shape | 25 | 50 | 20 |
| Reference Example 35 | 10.0 | Nylon | Amorphous shape | 30 | 50 | 30 |
| Reference Example 36 | 10.0 | Nylon | Amorphous shape | 20 | 40 | 20 |
| Reference Example 37 | 10.0 | Nylon | Amorphous shape | 20 | 40 | 20 |
| Reference Example 38 | 10.0 | Nylon | Amorphous shape | 25 | 35 | 30 |
| Reference Example 39 | 20.0 | Nylon | Amorphous shape | 25 | 45 | 15 |
| Reference Example 40 | 20.0 | Nylon | Amorphous shape | 25 | 45 | 15 |
| Reference Example 41 | 20.0 | Nylon | Amorphous shape | 25 | 45 | 15 |
| Reference Example 42 | 20.0 | Nylon | Amorphous shape | 25 | 45 | 15 |
| Reference Example 43 | 20.0 | Nylon | Amorphous shape | 25 | 45 | 15 |

TABLE 1-continued

| | | | | | | |
|---|---|---|---|---|---|---|
| Reference Example 44 | 20.0 | Nylon | Amorphous shape | 25 | 45 | 15 |
| Reference Example 45 | 20.0 | Nylon | Amorphous shape | 25 | 45 | 15 |
| Reference Example 46 | 20.0 | Nylon | Amorphous shape | 25 | 45 | 15 |
| Reference Example 47 | 20.0 | Nylon | Amorphous shape | 25 | 45 | 15 |
| Reference Example 48 | 20.0 | Nylon | Amorphous shape | 25 | 45 | 15 |
| Reference Example 49 | 20.0 | Nylon | Amorphous shape | 25 | 45 | 15 |
| Reference Example 50 | 20.0 | Nylon | Amorphous shape | 25 | 45 | 15 |
| Reference Example 51 | 20.0 | Nylon | Amorphous shape | 20 | 35 | 10 |
| Reference Example 52 | 5.0 | Nylon | Amorphous shape | 10 | 20 | 15 |
| Reference Example 53 | 5.0 | Nylon | Amorphous shape | 10 | 20 | 15 |
| Reference Example 54 | 5.0 | Nylon | Amorphous shape | 10 | 20 | 15 |
| Reference Example 55 | 5.0 | Nylon | Amorphous shape | 10 | 20 | 15 |
| Reference Example 56 | 5.0 | Nylon | Amorphous shape | 10 | 20 | 15 |
| Reference Example 57 | 5.0 | Nylon | Amorphous shape | 10 | 20 | 15 |
| Reference Example 58 | 5.0 | Nylon | Amorphous shape | 10 | 20 | 15 |
| Reference Example 59 | 5.0 | Nylon | Amorphous shape | 10 | 20 | 15 |
| Reference Example 60 | 5.0 | Nylon | Amorphous shape | 10 | 20 | 15 |
| Reference Example 61 | 5.0 | Nylon | Amorphous shape | 10 | 20 | 15 |
| Reference Example 62 | 20.0 | Nylon | Amorphous shape | 5 | 10 | 20 |
| Comparative Example 1 | — | — | — | — | 5 | — |
| Comparative Example 2 | 5.0 | Nylon | Amorphous shape | 5 | 30 | 35 |
| Comparative Example 3 | 10 | PMMA | Spherical shape | 20 | 40 | 20 |

TABLE 2

| | Roller shape factor α | Amount of crown [μm] | One-side load [g] | Asker C hardness of charging member | Diameter of core rod [mm] |
|---|---|---|---|---|---|
| Reference Example 1 | 2.0 | 55 | 600 | 78 | φ8 |
| Reference Example 2 | 2.0 | 70 | 600 | 78 | φ8 |
| Reference Example 3 | 2.0 | 85 | 600 | 78 | φ8 |
| Reference Example 4 | 2.0 | 100 | 600 | 78 | φ8 |
| Reference Example 5 | 1.5 | 50 | 600 | 78 | φ8 |
| Reference Example 6 | 2.5 | 60 | 600 | 78 | φ8 |
| Reference Example 7 | 1.8 | 95 | 600 | 78 | φ8 |
| Reference Example 8 | 2.2 | 105 | 600 | 78 | φ8 |
| Reference Example 9 | 2.0 | 55 | 450 | 78 | φ8 |
| Reference Example 10 | 2.0 | 55 | 750 | 78 | φ8 |
| Reference Example 11 | 2.0 | 55 | 600 | 74 | φ8 |
| Reference Example 12 | 2.0 | 55 | 600 | 82 | φ10 |
| Reference Example 13 | 2.0 | 70 | 600 | 78 | φ8 |
| Reference Example 14 | 2.0 | 70 | 600 | 78 | φ8 |
| Reference Example 15 | 2.0 | 55 | 600 | 78 | φ8 |
| Reference Example 16 | 2.0 | 70 | 600 | 78 | φ8 |
| Reference Example 17 | 2.0 | 85 | 600 | 78 | φ8 |
| Reference Example 18 | 2.0 | 100 | 600 | 78 | φ8 |
| Reference Example 19 | 1.5 | 50 | 600 | 78 | φ8 |
| Reference Example 20 | 2.5 | 60 | 600 | 78 | φ8 |
| Reference Example 21 | 1.8 | 95 | 600 | 78 | φ8 |
| Reference Example 22 | 2.2 | 105 | 600 | 78 | φ8 |
| Reference Example 23 | 2.0 | 100 | 450 | 78 | φ8 |
| Reference Example 24 | 2.0 | 100 | 750 | 78 | φ8 |

TABLE 2-continued

| | | | | | |
|---|---|---|---|---|---|
| Reference Example 25 | 2.0 | 100 | 600 | 74 | φ8 |
| Reference Example 26 | 2.0 | 100 | 600 | 82 | φ10 |
| Reference Example 27 | 2.0 | 70 | 600 | 78 | φ8 |
| Reference Example 28 | 2.0 | 70 | 600 | 78 | φ8 |
| Reference Example 29 | 2.0 | 85 | 600 | 78 | φ8 |
| Reference Example 30 | 2.0 | 85 | 600 | 78 | φ8 |
| Reference Example 31 | 2.0 | 85 | 600 | 78 | φ8 |
| Reference Example 32 | 2.0 | 70 | 600 | 78 | φ8 |
| Reference Example 33 | 2.0 | 85 | 600 | 78 | φ8 |
| Reference Example 34 | 2.0 | 85 | 600 | 78 | φ8 |
| Reference Example 35 | 2.0 | 70 | 600 | 78 | φ8 |
| Reference Example 36 | 2.0 | 70 | 600 | 78 | φ8 |
| Reference Example 37 | 2.0 | 70 | 600 | 78 | φ8 |
| Reference Example 38 | 2.0 | 70 | 600 | 78 | φ8 |
| Reference Example 39 | 2.0 | 55 | 600 | 78 | φ8 |
| Reference Example 40 | 2.0 | 70 | 600 | 78 | φ8 |
| Reference Example 41 | 2.0 | 85 | 600 | 78 | φ8 |
| Reference Example 42 | 2.0 | 100 | 600 | 78 | φ8 |
| Reference Example 43 | 1.5 | 50 | 600 | 78 | φ8 |
| Reference Example 44 | 2.5 | 60 | 600 | 78 | φ8 |
| Reference Example 45 | 1.8 | 95 | 600 | 78 | φ8 |
| Reference Example 46 | 2.2 | 105 | 600 | 78 | φ8 |
| Reference Example 47 | 2.0 | 55 | 450 | 78 | φ8 |
| Reference Example 48 | 2.0 | 55 | 750 | 78 | φ8 |
| Reference Example 49 | 2.0 | 55 | 600 | 74 | φ8 |
| Reference Example 50 | 2.0 | 55 | 600 | 82 | φ10 |
| Reference Example 51 | 2.0 | 70 | 600 | 78 | φ8 |
| Reference Example 52 | 2.0 | 55 | 600 | 78 | φ8 |
| Reference Example 53 | 2.0 | 70 | 600 | 78 | φ8 |
| Reference Example 54 | 2.0 | 85 | 600 | 78 | φ8 |
| Reference Example 55 | 2.0 | 100 | 600 | 78 | φ8 |
| Reference Example 56 | 1.8 | 95 | 600 | 78 | φ8 |
| Reference Example 57 | 2.5 | 110 | 600 | 78 | φ8 |
| Reference Example 58 | 2.0 | 100 | 450 | 78 | φ8 |
| Reference Example 59 | 2.0 | 100 | 750 | 78 | φ8 |
| Reference Example 60 | 2.0 | 100 | 600 | 74 | φ8 |
| Reference Example 61 | 2.0 | 100 | 600 | 82 | φ8 |
| Reference Example 62 | 2.0 | 70 | 600 | 78 | φ10 |
| Comparative Example 1 | 1.0 | 50 | 600 | 78 | φ10 |
| Comparative Example 2 | 2.0 | 115 | 400 | 78 | φ10 |
| Comparative Example 3 | 3.0 | 85 | 600 | 84 | φ10 |

| | | | | Charging uniformity Micro jitter | |
|---|---|---|---|---|---|
| | Rz [μm] | Sm [μm] | Passive rotation stability | Initial stage | After run |
| Reference Example 1 | 20 | 50 | A | B | C |
| Reference Example 2 | 20 | 50 | A | B | B |
| Reference Example 3 | 20 | 50 | A | A | B |
| Reference Example 4 | 20 | 50 | A | A | B |
| Reference Example 5 | 20 | 50 | A | B | C |
| Reference Example 6 | 20 | 50 | A | B | C |
| Reference Example 7 | 20 | 50 | A | A | B |
| Reference Example 8 | 20 | 50 | A | A | B |
| Reference Example 9 | 20 | 50 | B | B | C |
| Reference Example 10 | 20 | 50 | A | A | C |
| Reference Example 11 | 20 | 50 | A | B | C |
| Reference Example 12 | 20 | 50 | B | B | C |
| Reference Example 13 | 24 | 60 | A | A | C |
| Reference Example 14 | 34 | 50 | A | A | C |
| Reference Example 15 | 35 | 60 | A | A | C |
| Reference Example 16 | 35 | 60 | A | A | B |
| Reference Example 17 | 35 | 60 | A | A | A |
| Reference Example 18 | 35 | 60 | A | A | A |
| Reference Example 19 | 35 | 60 | A | A | B |
| Reference Example 20 | 35 | 60 | A | A | B |
| Reference Example 21 | 35 | 60 | A | A | B |
| Reference Example 22 | 35 | 60 | A | A | B |
| Reference Example 23 | 35 | 60 | B | A | A |
| Reference Example 24 | 35 | 60 | A | A | A |
| Reference Example 25 | 35 | 60 | A | A | A |
| Reference Example 26 | 35 | 60 | B | A | A |
| Reference Example 27 | 23 | 80 | A | A | B |
| Reference Example 28 | 26 | 70 | A | A | B |
| Reference Example 29 | 23 | 100 | A | A | A |
| Reference Example 30 | 26 | 110 | A | A | A |
| Reference Example 31 | 21 | 150 | A | A | A |
| Reference Example 32 | 23 | 140 | A | A | B |

TABLE 2-continued

| | | | | | |
|---|---|---|---|---|---|
| Reference Example 33 | 23 | 150 | A | A | A |
| Reference Example 34 | 23 | 160 | A | A | A |
| Reference Example 35 | 40 | 150 | A | A | B |
| Reference Example 36 | 26 | 150 | A | A | A |
| Reference Example 37 | 23 | 200 | A | A | B |
| Reference Example 38 | 34 | 210 | A | A | B |
| Reference Example 39 | 25 | 230 | A | A | B |
| Reference Example 40 | 25 | 230 | A | A | B |
| Reference Example 41 | 25 | 230 | A | A | A |
| Reference Example 42 | 25 | 230 | A | A | A |
| Reference Example 43 | 25 | 230 | A | A | B |
| Reference Example 44 | 25 | 230 | A | A | B |
| Reference Example 45 | 25 | 230 | A | A | B |
| Reference Example 46 | 25 | 230 | A | A | B |
| Reference Example 47 | 25 | 230 | B | A | B |
| Reference Example 48 | 25 | 230 | A | A | B |
| Reference Example 49 | 25 | 230 | A | A | B |
| Reference Example 50 | 25 | 230 | B | A | B |
| Reference Example 51 | 24 | 240 | A | A | B |
| Reference Example 52 | 15 | 240 | A | C | C |
| Reference Example 53 | 15 | 240 | A | C | C |
| Reference Example 54 | 15 | 240 | B | B | B |
| Reference Example 55 | 15 | 240 | B | B | B |
| Reference Example 56 | 15 | 240 | C | B | B |
| Reference Example 57 | 15 | 240 | C | B | B |
| Reference Example 58 | 15 | 240 | C | B | B |
| Reference Example 59 | 15 | 240 | A | B | B |
| Reference Example 60 | 15 | 240 | A | B | B |
| Reference Example 61 | 15 | 240 | C | B | C |
| Reference Example 62 | 35 | 250 | A | B | C |
| Comparative Example 1 | 15 | 20 | D | D | D |
| Comparative Example 2 | 47 | 300 | D | C | D |
| Comparative Example 3 | 23 | 190 | D | A | D |

As shown in the Reference Examples, the charging roller 10 achieved charging uniformity and stability over a long period of time and graininess in image quality was maintained.

As described above, charging uniformity and stability over a long period of time can be achieved and graininess in image quality can be maintained in the example of the above-mentioned charging roller 10. For example, in a case in which the constant $\alpha$ is set to satisfy $1.8 \leq \alpha \leq 2.2$, it is easier to achieve stable charging uniformity and to maintain graininess in image quality.

For example, amorphous particles may be used as the first and second particles 31 and 32. Since these particles have a good affinity with the matrix material 30, adhesion strength on interfaces between the matrix material 30 and the first and second particles 31 and 32 can be improved. Accordingly, durability can be further improved.

For example, at least one of the first and second particles 31 and 32 may be any one of a nylon particle, a urethane particle, and an acrylic particle. Since such particles have a good affinity with the matrix material 30, adhesion strength on interfaces between the matrix material 30 and the particles can be improved. Accordingly, durability can be further improved.

For example, the conductive elastic body layer 2 may contain epichlorohydrin rubber. Accordingly, since defects caused by a change in resistance during production can be reduced, productivity can be further improved. Further, adhesion between the conductive elastic body layer 2 and the conductive resin layer 3 can be improved.

Figure 5:
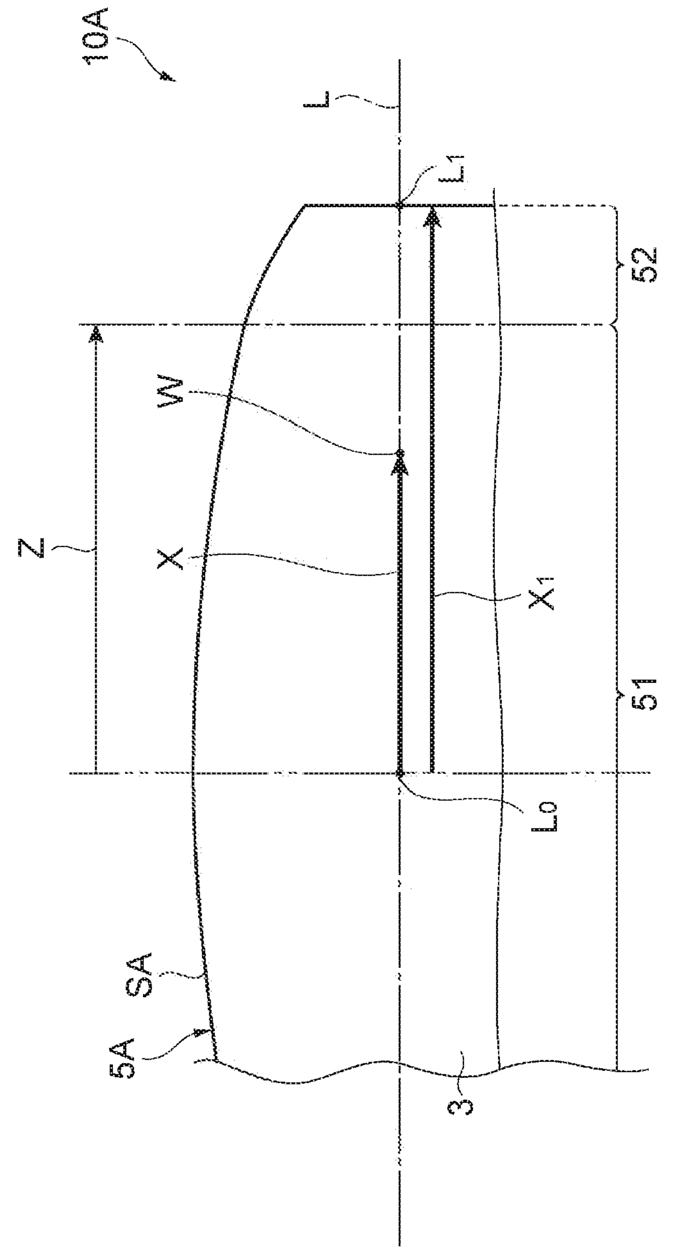
FIG. 5 is a diagram illustrating an example shape of the roller surface of another example charging roller.

Next, another example of the charging roller will be described. As illustrated in FIG. 5, the shape of a roller surface SA of a roller body 5A of a charging roller 10A of another example is different from the shape of the roller surface S of the charging roller 10 described with reference to FIG. 1 and the like. The structure of the charging roller 10A except for the shape of the roller surface SA is the same as that of the above-mentioned charging roller 10. In some examples, the charging roller 10A may include the conductive support 1, the conductive elastic body layer 2, and the conductive resin layer 3 having been described above.

As illustrated in FIG. 5, a distance between the middle point $L_0$ and an arbitrary point W on the rotation axis L is denoted by X. A distance between the middle point $L_0$ and the position $L_1$ of an end portion of the roller body 5 on the rotation axis L is denoted by $X_1$. The shape of the roller surface SA of the roller body 5A at a portion where the distance X is shorter than a distance Z is different from that at a portion where the distance X is equal to or longer than the distance Z and is equal to or shorter than the distance $X_1$. The distance Z is longer than 0 and is shorter than the distance $X_1$.

A portion of the roller body 5A where the distance X is shorter than the distance Z is referred to as a roller middle portion 51. A portion of the roller body 5A where the distance X is equal to or longer than the distance Z and is equal to or shorter than the distance $X_1$ is referred to as a roller side portion 52. The roller side portion 52 is provided at each of both end portions of the roller middle portion 51. The roller body 5A is represented by Expression where the shape of the roller surface SA at the roller middle portion 51 is different from the shape of the roller surface SA at each roller side portion 52.

Figure 6:
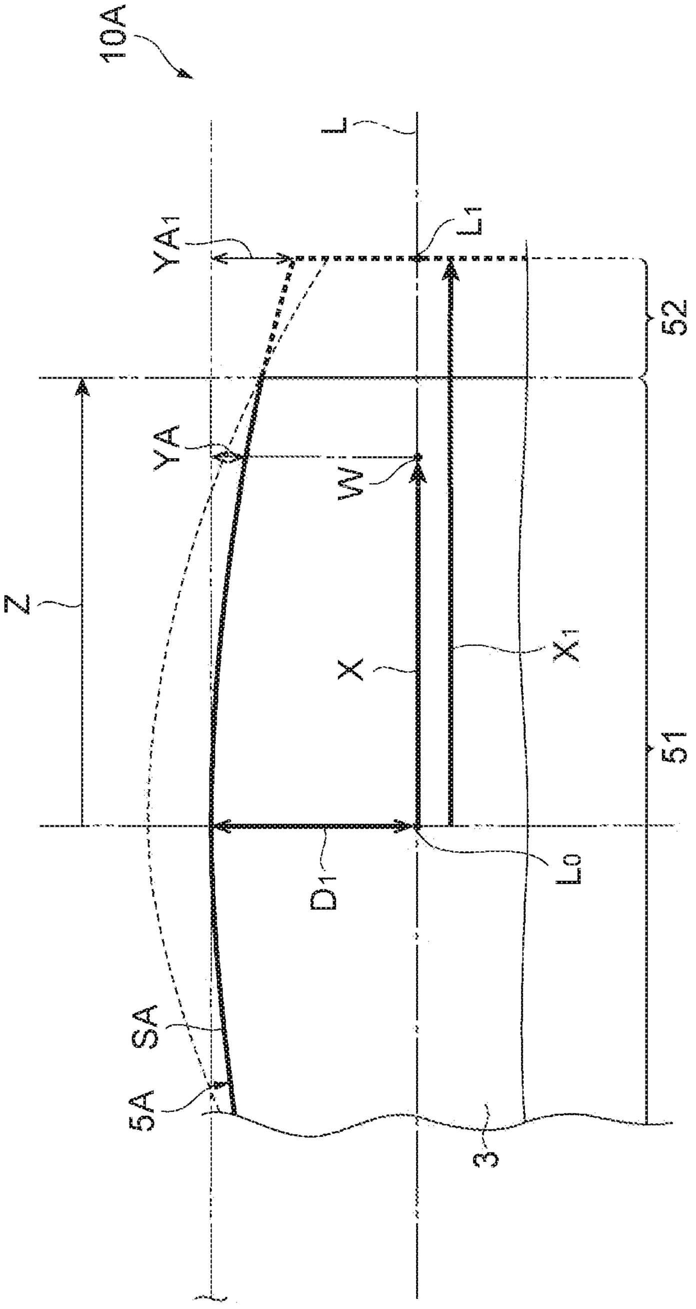
FIG. 6 is a diagram illustrating an example shape of a middle portion of an example charging roller.

First, the shape of the roller surface SA at the roller middle portion 51 will be described. As illustrated in FIG. 6, a distance between the middle point $L_0$ and an arbitrary point W on the rotation axis L is denoted by X. A reduction in a radius at the arbitrary point W from the maximum radius $D_1$ at the middle point $L_0$ is denoted by YA. A distance between the middle point $L_0$ and the position $L_1$ of an end portion of the roller body 5 on the rotation axis L is denoted by $X_1$. A reduction in a radius at the position $L_1$ of the end portion from the maximum radius $D_1$ at the middle point $L_0$ is denoted by $YA_1$. Each of the reduction YA and the reduction $YA_1$ is a reduction that is obtained in a case in which the amount of crown of the roller body is a first amount of crown. The surface shape of the roller body, which is obtained in a case in which the amount of crown is the first amount of crown, is illustrated in FIG. 6 with thick lines (a thick solid line and a thick broken line).

The shape of the roller surface SA at the roller middle portion 51 (a portion where the distance X is shorter than the distance Z) is represented by the following Expression (2).

$$YA/YA_1=(X/X_1)\exp(\alpha_1) \quad (2)$$

A constant $\alpha_1$ may satisfy $1.5 \leq \alpha_1 \leq 2.5$ in terms of achieving charging uniformity and stability over a long period of time and maintaining graininess in image quality while the roller body is kept in close contact with the photoreceptor. From the same point of view, the constant $\alpha_1$ may satisfy $1.8 \leq \alpha_1 \leq 2.2$.

Figure 7:
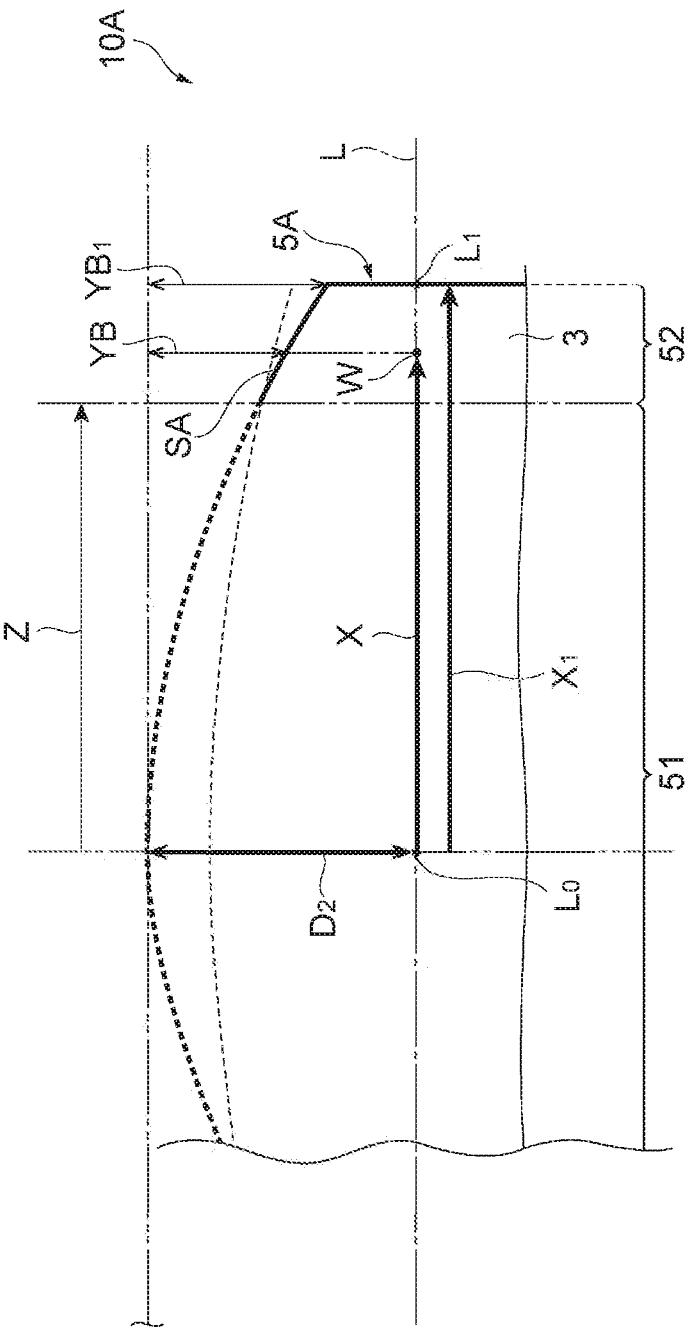
FIG. 7 is a diagram illustrating an example shape of a side portion of the example charging roller of FIG. 6.

Next, the shape of the roller surface SA at each roller side portion 52 will be described. As illustrated in FIG. 7, a distance between the middle point $L_0$ and an arbitrary point W on the rotation axis L is denoted by X. A reduction in a radius at the arbitrary point W from the maximum radius $D_2$ at the middle point $L_0$ is denoted by YB. A distance between the middle point $L_0$ and the position $L_1$ of an end portion of the roller body 5 on the rotation axis L is denoted by $X_1$. A reduction in a radius at the position $L_1$ of the end portion from the maximum radius $D_2$ at the middle point $L_0$ is denoted by $YB_1$. Each of the reduction YB and the reduction $YB_1$ is a reduction that is obtained in a case in which the amount of crown of the roller body is a second amount of crown larger than the first amount of crown. The surface shape of the roller body, which is obtained in a case in which the amount of crown is the second amount of crown, is illustrated in FIG. 7 with thick lines (a thick solid line and a thick broken line).

The shape of the roller surface SA at each roller side portion 52 (a portion where the distance X is equal to or longer than the distance Z and is equal to or shorter than the distance $X_1$) is represented by the following Expression (3).

$$YB/YB_1=(X/X_1)\exp(\alpha_2) \tag{3}$$

A constant $\alpha_2$ is equal to or larger than the constant $\alpha_1$ and is 4.0 or less.

As described above, the shape of the roller surface SA of the charging roller 10A of another example at the roller middle portion 51 is represented by Expression (2), and the shape of the roller surface SA of the charging roller 10A of another example at each roller side portion 52 is represented by Expression (3).

The distance Z may be equal to or shorter than a distance that is obtained by subtracting 30 mm from the distance $X_1$ and be equal to or longer than a distance that is obtained by subtracting 60 mm from the distance $X_1$. For example, the width of the roller side portion 52 (the length of the roller side portion 52 along the rotation axis L) may be in the range of 30 mm to 60 mm.

Figure 8:
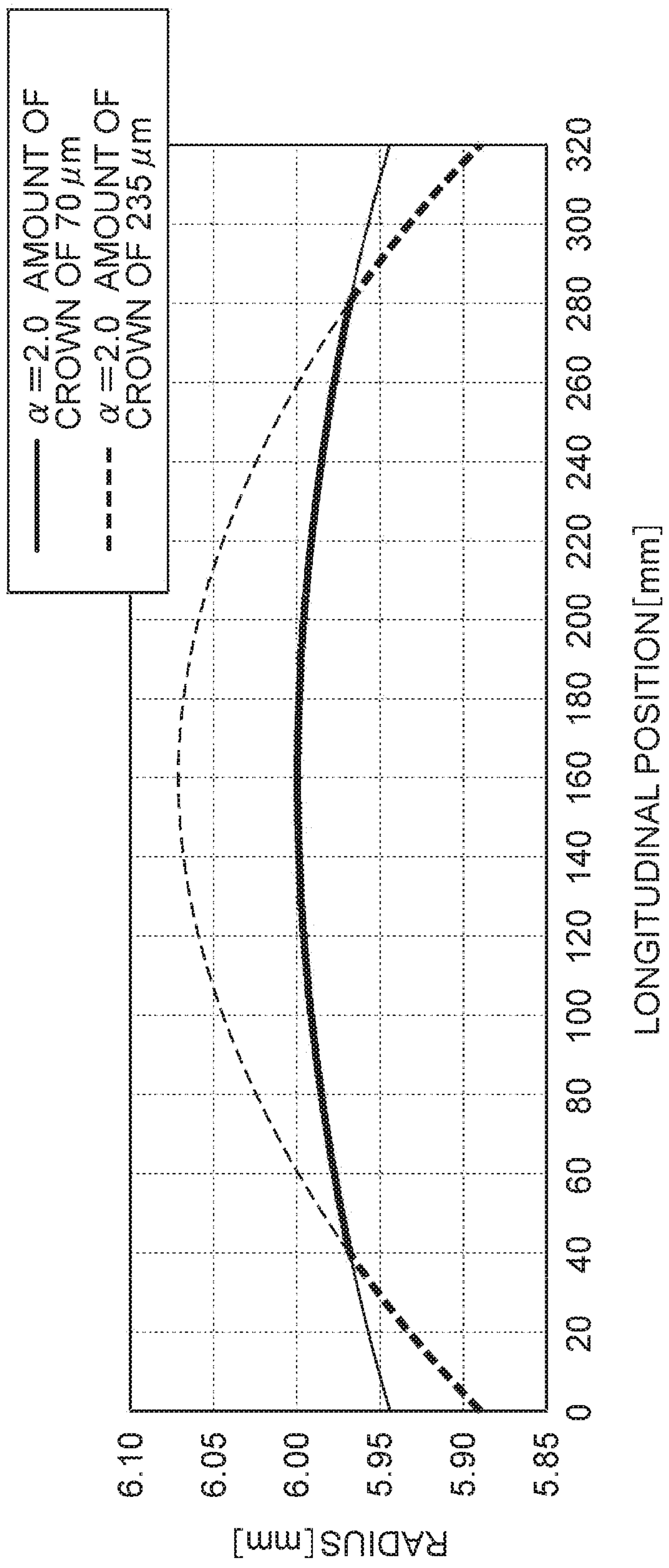
FIG. 8 is a diagram illustrating an example shape of the roller surface of an example roller body in a case in which the amount of crown at the roller middle portion is different from the amount of crown at the roller side portion.

FIG. 8 illustrates an example of the roller shape of the roller body 5A that is obtained in a case in which the constant $\alpha_1$ and the constant $\alpha_2$ are equal to each other and the first amount of crown and the second amount of crown are different from each other. Here, the width of the roller body 5A (the length of the roller body 5A in the direction of the rotation axis L) was set to 320 mm. FIG. 8 illustrates the radius of the roller body 5A at each position in the longitudinal direction of the roller body 5A (width direction). In FIG. 8, portions illustrated with thick lines (a thick solid line and a thick broken line) represent the shape of the roller surface SA of the roller body 5A.

Figure 9:
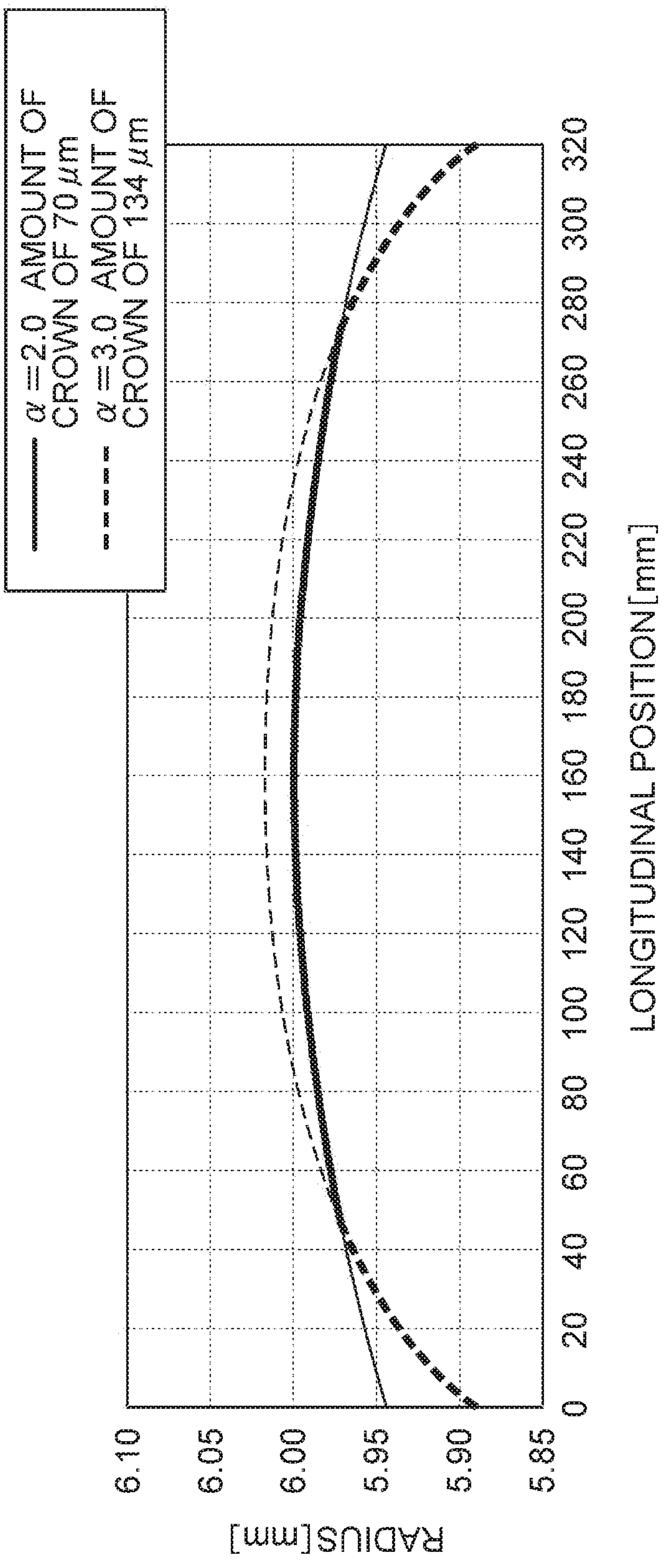
FIG. 9 is a diagram illustrating the shape of the roller surface of another example roller body in a case in which the amount of crown at the roller middle portion is different from the amount of crown at the roller side portion.

FIG. 9 illustrates an example of the roller shape of the roller body 5A that is obtained in a case in which the constant $\alpha_2$ is larger than the constant $\alpha_1$ and is 4.0 or less, and the first amount of crown and the second amount of crown are different from each other. In FIG. 9, portions illustrated with thick lines (a thick solid line and a thick broken line) represent the shape of the roller surface SA of the roller body 5A.

As described above, in the above-mentioned charging roller 10A of an example roller, the shape of the roller surface SA at the roller middle portion 51 and the shape of the roller surface SA at each roller side portion 52 are represented by Expressions that are different from each other. Accordingly, the charging roller 10A can reduce pressure distribution at the roller side portions 52 while ensuring drive stability at the roller middle portion 51. Therefore, the charging roller 10A can reduce the adhesion of an external additive thereto at each roller side portion 52, and thus the charging roller 10A can suppress an adverse effect at the end portion of an image to be formed by the image forming apparatus.

Further, the distance Z corresponding to a boundary between the roller middle portion 51 and the roller side portion 52 may be equal to or shorter than a distance that is obtained by subtracting 30 mm from the distance $X_1$ and be equal to or longer than a distance that is obtained by subtracting 60 mm from the distance $X_1$. In this case, a portion of the charging roller 10A where an adverse effect on an image to be formed is likely to occur can be formed of the roller side portion 52 of which the shape is different from the shape of the roller middle portion 51.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

One or more of the above-mentioned examples and/or features thereof can be expressed by the respective example features described below.

Disclosed herein is a charging roller including: a roller body that is rotationally symmetric with respect to a rotation axis, in which the roller body includes a curved roller surface, a radius from the rotation axis to the roller surface becomes maximum at a middle point of the roller body on the rotation axis and is reduced toward both end portions of the roller body, and the shape of the roller surface is represented by $Y/Y_1=(X/X_1)\exp(\alpha)$. The constant $\alpha$ is in the range of 1.5 to 2.5, a distance between the middle point and an arbitrary point on the rotation axis is denoted by X, a reduction in the radius at the arbitrary point from the maximum radius at the middle point is denoted by Y, a distance between the middle point and the position of an end portion of the roller body on the rotation axis is denoted by $X_1$, and a reduction in the radius at the position of the end portion from the maximum radius at the middle point is denoted by $Y_1$.

The constant $\alpha$ may also satisfy $1.8 \leq \alpha \leq 2.2$.

The amount of crown of the roller body may be in the range of 50 μm to 110 μm.

The Asker C hardness of the roller body may be in the range of 74 to 82.

The charging roller may further include: a conductive support that serves as a rotating shaft of the roller body, in which the roller body includes a conductive elastic body layer that is laminated on the outer peripheral surface of the conductive support, and a conductive resin layer that is laminated on the conductive elastic body layer as the outermost layer. The conductive resin layer may contain a matrix material and particles, the particles including first resin particles or first inorganic particles and second resin particles or second inorganic particles. A thickness A of a portion of the conductive resin layer not including the particles may be in the range of 1.0 μm to 7.0 μm, an average particle size B of the first resin particles or the first inorganic particles may be in the range of 15.0 μm to 40.0 μm, and a value, which is obtained by subtracting an average particle size C of the second resin particles or the second inorganic particles from the average particle size B, may be 10.0 μm or more. A ten-point average roughness Rzjis of the surface of the roller body may be in the range of 15.0 μm to 40.0 μm, and an interparticle distance Sm, which is a distance between the particles, may be in the range of 50 μm to 250 μm.

A load may be applied to each of both end portions of the conductive support, and a load in the range of 450 grams to 750 grams may be applied to one end portion of the conductive support.

A portion of the conductive support, which is covered with the conductive elastic body layer, may be formed in the shape of a column or a circular pipe extending in the direction of the rotation axis and the diameter thereof may be constant in the direction of the rotation axis, and the diameter of the portion of the conductive support, which is covered with the conductive elastic body layer, may be in the range of 8 mm to 10 mm.

The particles may be insulating particles.

Part by mass of the particles based on parts by mass of the conductive resin layer may be in the range of 10% to 70%.

The particles may be amorphous shape particles.

At least one of the first resin particle and the second resin particle may be any one of a nylon particle, a urethane particle, and an acrylic particle.

The conductive elastic body layer may contain epichlorohydrin rubber.

A DC voltage may be exlusively applied to the charging roller.

Disclosed herein is a charging roller including: a roller body that is rotationally symmetric with respect to a rotation axis, in which the roller body includes a curved roller surface, a radius from the rotation axis to the roller surface becomes maximum at a middle point of the roller body on the rotation axis and is reduced toward both end portions of the roller body. When a distance between the middle point and an arbitrary point on the rotation axis is denoted by X and a distance between the middle point and the position of an end portion of the roller body on the rotation axis is denoted by $X_1$. The shape of the roller surface at a portion where the distance X is shorter than a distance Z is different from that at a portion where the distance X is equal to or longer than the distance Z and is equal to or shorter than the distance $X_1$. The shape of the roller surface at the portion where the distance X is shorter than the distance Z is represented by $YA/YA_1=(X/X_1)\exp(\alpha_1)$ where a reduction in the radius at the arbitrary point from the maximum radius at the middle point is denoted by YA, a reduction in the radius at the position of the end portion from the maximum radius at the middle point is denoted by $YA_1$, and each of the reduction YA and the reduction $YA_1$ is a reduction that is obtained in a case in which the amount of crown of the roller body is a first amount of crown. The shape of the roller surface at a portion where the distance X is equal to or longer than the distance Z and is equal to or shorter than the distance $X_1$ is represented by $YB/YB_1=(X/X_1)\exp(\alpha_2)$ where a reduction in the radius at the arbitrary point from the maximum radius at the middle point is denoted by YB, a reduction in the radius at the position of the end portion from the maximum radius at the middle point is denoted by $YB_1$, and each of the reduction YB and the reduction $YB_1$ is a reduction that is obtained when the amount of crown of the roller body is a second amount of crown larger than the first amount of crown, the constant $\alpha_1$ is in the range of 1.5 to 2.5, and the constant $\alpha_2$ is equal to or larger than the constant $\alpha_1$ and is 4.0 or less.

The distance Z may be equal to or shorter than a distance that is obtained by subtracting 30 mm from the distance $X_1$ and is equal to or longer than a distance that is obtained by subtracting 60 mm from the distance $X_1$.

While the disclosure has been shown and described with reference to examples thereof, they are provided for illustration and it will be understood that various modifications and equivalent other examples may be made from the disclosure. Accordingly, the scope of the disclosure is defined by the appended claims.

What is claimed is:

1. A charging roller, comprising:

a roller body that is rotationally symmetric with respect to a rotation axis, wherein the roller body includes a curved roller surface, a radius from the rotation axis to the roller surface becomes maximum at a middle point of the roller body on the rotation axis and is reduced toward both end portions of the roller body, and the shape of the roller surface is represented by $Y/Y_1=(X/X_1)\exp(\alpha)$, and:

$\alpha$ is a constant in the range of 1.5 to 2.5;

X is a distance between the middle point and an arbitrary point on the rotation axis;

Y is a reduction in the radius at the arbitrary point from the maximum radius at the middle point;

X1 is a distance between the middle point and a position of an end portion of the roller body on the rotation axis; and Y1 is a reduction in the radius at the position of the end portion from the maximum radius at the middle point.

2. The charging roller according to claim 1, wherein the constant $\alpha$ satisfies $1.8\leq\alpha\leq2.2$.

3. The charging roller according to claim 1, wherein the amount of crown of the roller body is in a range of 50 μm to 110 μm.

4. The charging roller according to claim 1, wherein Asker C hardness of the roller body is in a range of 74 to 82.

5. The charging roller according to claim 1, comprising:

a conductive support that serves as a rotating shaft of the roller body, wherein the roller body includes a conductive elastic body layer that is laminated on an outer peripheral surface of the conductive support, and a conductive resin layer that is laminated on the conductive elastic body layer as an outermost layer, the conductive resin layer contains a matrix material and particles, the particles include first resin particles or first inorganic particles and second resin particles or second inorganic particles, a thickness A of a portion of the conductive resin layer not including the particles is in a range of 1.0 μm to 7.0 μm, an average particle size B of the first resin particles or the first inorganic particles is in a range of 15.0 μm to 40.0 μm, a value, which is obtained by subtracting an average particle size C of the second resin particles or the second inorganic particles from the average particle size B, is 10.0 μm or more, a ten-point average roughness Rzjis of the roller surface is in a range of 15.0 μm to 40.0 μm, and an interparticle distance Sm, which is a distance between the particles, is in a range of 50 μm to 250 μm.

6. The charging roller according to claim 5, wherein a separate load is applied to both end portions of the conductive support, including a first load in the range of 450 grams to 750 grams that is applied to one end portion of the conductive support.

7. The charging roller according to claim 5, wherein a portion of the conductive support, which is covered with the conductive elastic body layer, is formed in a shape of a column or a circular pipe extending in a direction of the rotation axis and a diameter of the shape is constant in the direction of the rotation axis, and the diameter of the portion of the conductive support, which is covered with the conductive elastic body layer, is in a range of 8 mm to 10 mm.

8. The charging roller according to claim 5, wherein the particles are insulating particles.

9. The charging roller according to claim 5, wherein parts by mass of the particles based on parts by mass of the conductive resin layer is in a range of 10% to 70%.

10. The charging roller according to claim 5,
wherein the particles are amorphous shape particles.

11. The charging roller according to claim 5,
wherein at least one of the first resin particle and the second resin particle is any one of a nylon particle, a urethane particle, and an acrylic particle.

12. The charging roller according to claim 5,
wherein the conductive elastic body layer contains epichlorohydrin rubber.

13. The charging roller according to claim 1,
wherein a DC voltage is exclusively applied to the charging roller.

14. A charging roller, comprising:
a roller body that is rotationally symmetric with respect to a rotation axis, the roller body including a curved roller surface,
a radius from the rotation axis to the roller surface becomes maximum at a middle point of the roller body on the rotation axis and is reduced toward both end portions of the roller body,
when a distance between the middle point and an arbitrary point on the rotation axis is denoted by X and a distance between the middle point and the position of an end portion of the roller body on the rotation axis is denoted by $X_1$, the shape of the roller surface at a portion where the distance X is shorter than a distance Z is different from that at a portion where the distance X is equal to or longer than the distance Z and is equal to or shorter than the distance $X_1$,
a shape of the roller surface at the portion of the roller body where the distance X is shorter than the distance Z is represented by $YA/YA_1=(X/X_1)\exp(\alpha_1)$, wherein a reduction in the radius at the arbitrary point from the maximum radius at the middle point is denoted by YA, a reduction in the radius at the position of the end portion from the maximum radius at the middle point is denoted by $YA_1$, and each of the reduction YA and the reduction $YA_1$ is a reduction that is obtained in a case in which the amount of crown of the roller body is a first amount of crown,
a shape of the roller surface at a portion of the roller body where the distance X is equal to or longer than the distance Z and is equal to or shorter than the distance $X_1$ is represented by $YB/YB_1=(X/X_1)\exp(\alpha_2)$, wherein a reduction in the radius at the arbitrary point from the maximum radius at the middle point is denoted by YB, a reduction in the radius at the position of the end portion from the maximum radius at the middle point is denoted by $YB_1$, and each of the reduction YB and the reduction $YB_1$ is a reduction that is obtained when the amount of crown of the roller body is a second amount of crown larger than the first amount of crown,
$\alpha_1$ is a constant in a range of 1.5 to 2.5, and
$\alpha_2$ is a constant that is equal to or larger than the constant $\alpha_1$ and is 4.0 or less.

15. The charging roller according to claim 14,
wherein the distance Z is equal to or shorter than a distance that is obtained by subtracting 30 mm from the distance $X_1$ and is equal to or longer than a distance that is obtained by subtracting 60 mm from the distance $X_1$.

* * * * *